United States Patent
Donohue et al.

(10) Patent No.: US 11,329,469 B2
(45) Date of Patent: May 10, 2022

(54) APPARATUS TO LIMIT EVENT ENERGY

(71) Applicant: Consolidated Edison Company of New York, Inc., New York, NY (US)

(72) Inventors: Michael Donohue, New York, NY (US); Colleen Murach, Red Bank, NJ (US); Stanley Lewis, Garden City, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 0 days.

(21) Appl. No.: 16/729,908

(22) Filed: Dec. 30, 2019

(65) Prior Publication Data

US 2021/0203145 A1    Jul. 1, 2021

(51) Int. Cl.
*B01D 53/02*   (2006.01)
*H02G 9/06*    (2006.01)
*H02G 3/04*    (2006.01)
*E02D 29/045*  (2006.01)
*C04B 14/18*   (2006.01)

(52) U.S. Cl.
CPC .............. *H02G 9/06* (2013.01); *C04B 14/18* (2013.01); *E02D 29/045* (2013.01); *H02G 3/0412* (2013.01)

(58) Field of Classification Search
CPC ....................................................... B01D 53/02
USPC ......................................................... 96/108
See application file for complete search history.

(56) References Cited

U.S. PATENT DOCUMENTS

| | | | | |
|---|---|---|---|---|
| 4,366,131 A | * | 12/1982 | Fox ........................ | B01D 53/52 423/231 |
| 2002/0078825 A1 | * | 6/2002 | Funke ................... | C01B 7/0725 95/117 |
| 2008/0011662 A1 | * | 1/2008 | Milosavljevic .......... | B01J 20/14 210/284 |
| 2009/0139245 A1 | * | 6/2009 | Blackway ............... | F25B 21/02 62/3.62 |
| 2012/0137880 A1 | * | 6/2012 | Butterworth ........... | B01D 53/04 95/90 |
| 2013/0171483 A1 | * | 7/2013 | Shibata ................. | H01M 10/04 429/56 |
| 2013/0220479 A1 | * | 8/2013 | Luo .......................... | F17C 5/06 141/4 |
| 2014/0030586 A1 | * | 1/2014 | Tononishi ........... | H01M 50/528 429/179 |
| 2015/0225097 A1 | * | 8/2015 | Anastasia ............ | A47C 27/082 53/432 |
| 2017/0348669 A1 | * | 12/2017 | Nagayama ........... | B01J 20/3236 |

* cited by examiner

*Primary Examiner* — Stanley Tso
(74) *Attorney, Agent, or Firm* — Cantor Colburn LLP

(57) ABSTRACT

An apparatus for limiting event energy in an underground structure having free space includes: an inner layer configured to envelope and seal an interior volume; an outer layer configured to envelope the inner layer; and, wherein the interior volume includes a volume-occupying material, having a solid material, a semi-solid material, a gaseous material, or any combination of the solid, the semi-solid, and the gaseous material.

25 Claims, 5 Drawing Sheets

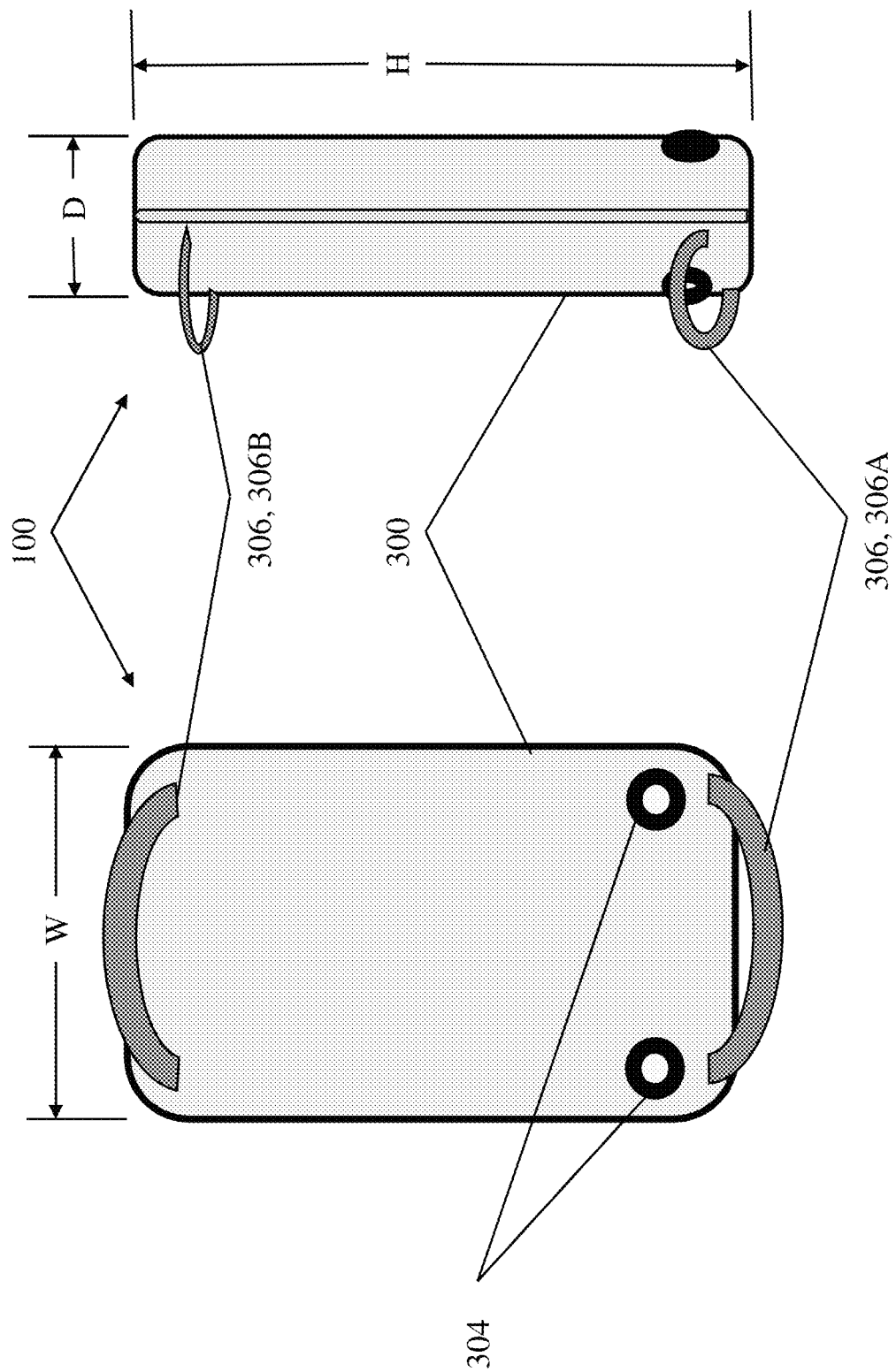

APPARATUS TO LIMIT EVENT ENERGY

BACKGROUND

The present disclosure relates generally to an apparatus to limit event energy, particularly to an apparatus to limit event energy in an underground structure having free space.

Underground utility structures are common in municipalities for housing electrical and/or mechanical distribution systems or utilities, such as electrical cables, associated connections, and associated distribution apparatus for example. Access to these underground structures is necessary in order to carry out maintenance and/or repair of the associated utilities, which results in underground free space that is needed temporarily when work on the utilities needs to be performed, but where the free space remains unoccupied when no work on the utilities is required. Such free space provides an underground volume of space where gases, non-combustible and combustible, may accumulate. Combustible gasses may be generated by electrical arcing that breaks down cable insulation, and or from leaks in a natural gas distribution system. The accumulation of these combustible gasses can result in an event that is physically manifest in the form of smoke, fire, or explosion. Event energy associated with an explosion may not only create an undesirable condition underground, but may also create an undesirable condition above ground in the event a manhole cover is inadvertently dislodged or lifted due to the resulting energy release. Solutions to limit the event energy associated with such combustible gases if or when they may combust have included the use of sand to fill at least a portion of the free space of the underground volume. However, the use of such sand has its drawbacks when the need arises to perform maintenance work and the sand needs to be removed.

While existing schemes to limit event energy in an underground structure may be suitable for their intended purpose, the art relating to the limit of event energy in an underground structure would be advanced with an apparatus that overcomes the drawbacks of the prior art systems.

BRIEF SUMMARY

An embodiment includes an apparatus for limiting event energy in an underground structure having free space, the apparatus having: an inner layer configured to envelope and seal an interior volume; an outer layer configured to envelope the inner layer; and, wherein the interior volume includes a volume-occupying material, having a solid material, a semi-solid material, a gaseous material, or any combination of the solid, the semi-solid, and the gaseous material.

An embodiment includes a method of removing free space from an underground structure, the method including: providing access to the underground structure; inserting one or more of the aforementioned apparatus for limiting event energy into the free space of the underground structure to occupy at least a portion of the free space; and, closing access to the underground structure.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures:

FIGS. 2A and 2B depict back and side views of an example apparatus, in accordance with an embodiment;

DETAILED DESCRIPTION

Figure 1:
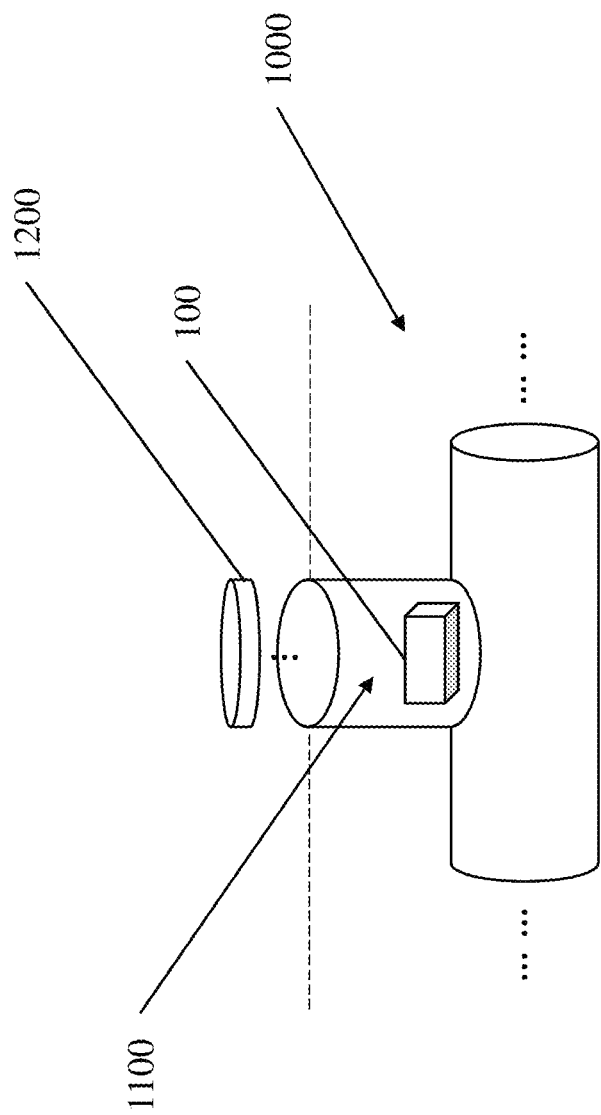
FIG. 1 depicts an apparatus disposed in situ, in accordance with an embodiment.

Although the following detailed description contains many specifics for the purposes of illustration, anyone of ordinary skill in the art will appreciate that many variations and alterations to the following details are within the scope of the appended claims. Accordingly, the following example embodiments are set forth without any loss of generality to, and without imposing limitations upon, the claimed invention disclosed herein.

With reference to FIGS. 1-3B collectively, an embodiment includes an apparatus 100 for limiting event energy in an underground structure 1000 (ground level depicted by horizontal dashed lines in FIG. 1) having free space 1100 and a removable cover 1200, where the apparatus 100 has an inner layer 200 (FIG. 2C) configured to envelope and seal an interior volume 202, and an outer layer 300 (FIGS. 2A and 2C) configured to envelope the inner layer 200.

For effective deployment of the apparatus 100 in the free space 1100 of the underground structure 1000 having the removable cover 1200 (a manhole cover for example), it has been found that an apparatus 100 having a particular overall occupancy volume, having a particular weight, and having a particular shape, has proven effective and useful. For example, an apparatus 100 having an overall occupancy volume of equal to or greater than 1 cubic feet and equal to or less than 5 cubic feet, alternatively of equal to or greater than 1.5 cubic feet and equal to or less than 3.5 cubic feet, and further alternatively of equal to about 2.5 cubic feet, has been found to be effective for limiting explosion event energy of an underground explosion event. As used herein, the phrase overall occupancy volume refers to the volume of free space that the apparatus 100 is capable of occupying when inflated or filled in accordance with an embodiment disclosed herein. In an embodiment where the outer layer 300 has a rectangular-box-like shape (FIGS. 2A, 2B), the outer layer 300 of the apparatus 100 has an overall outside height (H), width (W), and depth (D), with non-limiting example dimensions of, H=30 inches, W=18 inches, and D=10 inches, which results in an overall occupancy volume of about 3 cubic feet. In any one particular installation, one, two, three, or more apparatus 100 may be used. Additionally, an apparatus 100 having an overall weight of equal to or greater than 5 pounds and equal to or less than 50 pounds, alternatively of equal to or greater than 15 pounds equal to or less than 30 pounds, and further alternatively of equal to about 25 pounds, has been found to be effective for ease of deployment. Further additionally, an apparatus 100, or more particularly the outer layer 300 of the apparatus 100, having a 3D rectangular-box-like shape (FIGS. 2A, 2B), alternatively a 3D cylindrical-disc-like shape (FIG. 3A), and further alternatively a 3D sphere-like shape (FIG. 3B), has been found to be effective in efficiently occupying and being formable within the free space 1100 in the underground structure 1000. Notwithstanding the foregoing, it will be appreciated that while a particular overall occupancy volume, or a particular overall weight, or a particular outer shape, may have been found appropriate for effective deployment and utility of the apparatus 100, it will be appreciated that other volumes, weights, and/or shapes, may be suitable for a purpose disclosed herein as long as they fall within a scope of the appended claims.

Figure 2C:
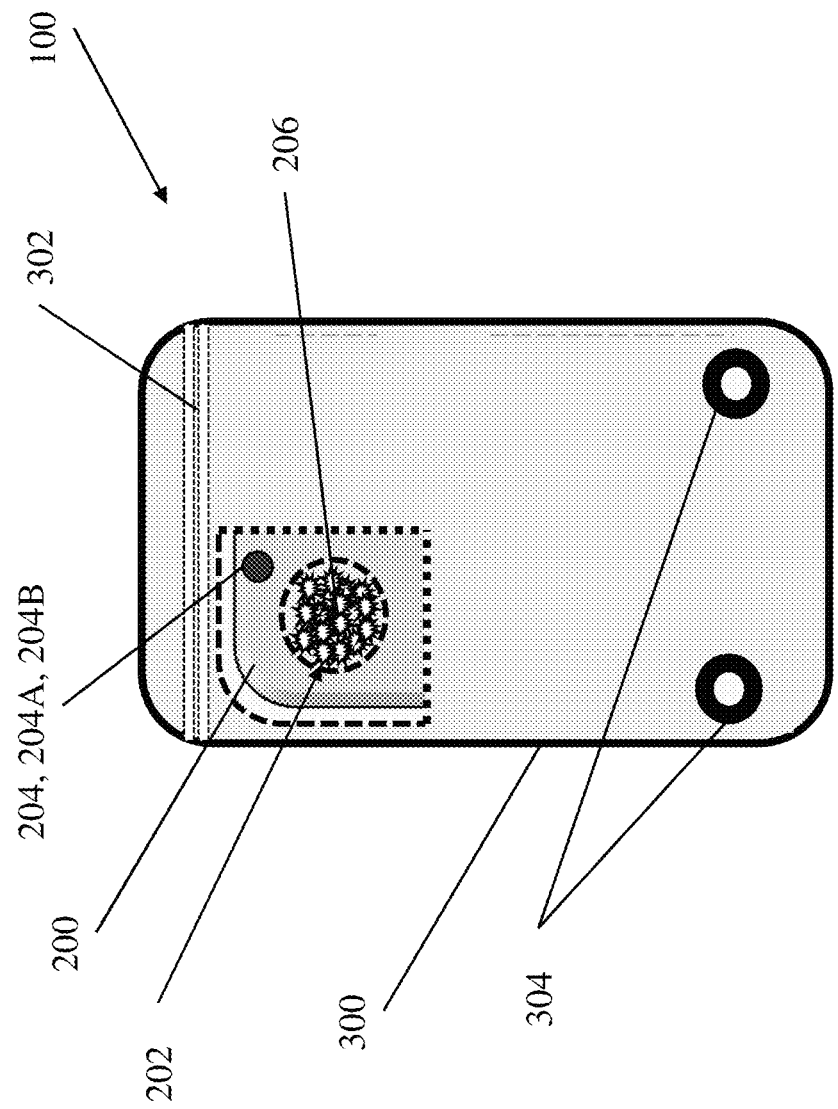
FIG. 2C depicts a front view of the apparatus of FIGS. 2A and 2B with a partial cutaway view, in accordance with an embodiment.
Figures 3A, 3B:
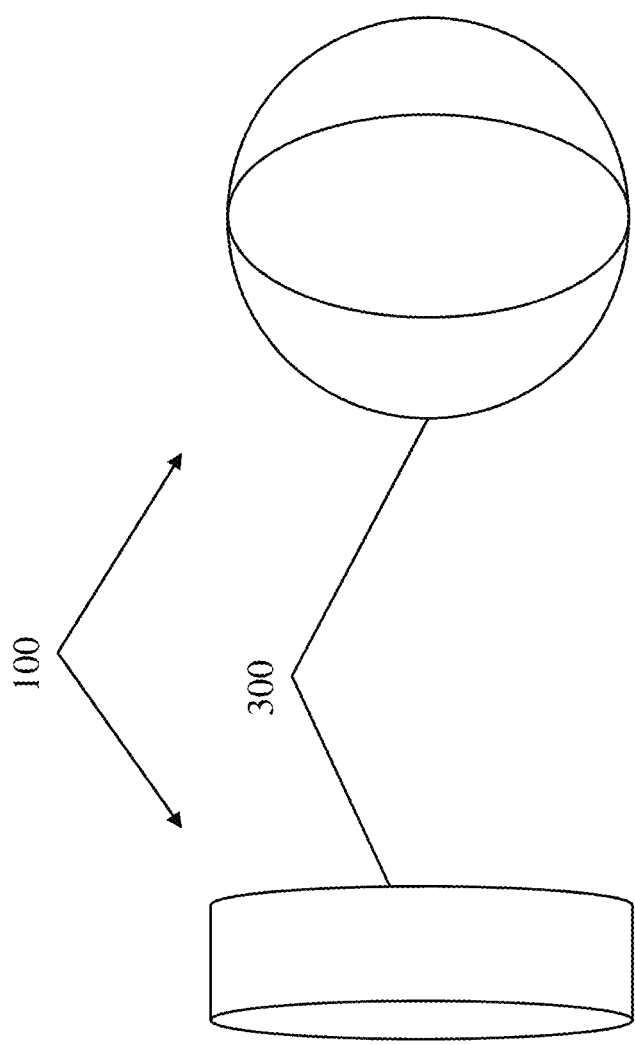
FIGS. 3A and 3B depict alternative apparatus to that of FIGS. 2A-2C, in accordance with an embodiment.

In an embodiment and with particular reference to FIG. 2C, the inner layer 200 is a non-permeable, non-electrically conducting, low flammability material, which may be polyethylene, polypropylene, or any other non-permeable, non-electrically conducting, low flammability material suitable for a purpose disclosed herein and falling within the scope of the appended claims. The interior volume 202 of the inner layer 200 may be inflated to, and in an embodiment is inflated to, an internal pressure of greater than 0 psi and equal to or less than 3 psi, alternatively to an internal pressure of greater than 0 psi and equal to or less than 1 psi, or further alternatively to an internal pressure of about 0.5 psi. When inflated, the interior volume 202 may be inflated with air, or any inert gas suitable for a purpose disclosed herein and falling with a scope of the appended claims. By employing a relatively low internal pressure on the order of about 0.5 psi, it has been found that the apparatus 100 may be made to effectively and efficiently conform to underground utilities within the free space 1100 of the underground structure 1000. To enable pressurization of the inner volume 202, the inner layer 200 may include a self-sealing port 204 configured to provide for inflation and deflation of the interior volume 202. In an embodiment, the self-sealing port 204 may be a simple balloon-type self-sealing orifice 204A, or a more complex valve 204B such as a pneumatic tire valve, for example.

To enhance the event energy limiting capability of the apparatus 100, the interior volume 202 of the inner layer 200 may be, and in an embodiment is, substantially filled with a volume-occupying material 206 that includes; a solid material, a semi-solid material, a gaseous material, or any combination of the solid, the semi-solid, and the gaseous material. In an embodiment, the interior volume 202 is occupied by the volume-occupying material 206 in an amount equal to or less than 90% and equal to or greater than 70%, alternatively equal to about 80%, of a maximum available volume of the interior volume 202. In an embodiment, the volume-occupying material 206 includes perlite or expanded perlite, however, other volume-occupying materials suitable for a purpose disclosed herein may be substituted for perlite, which are contemplated herein as long as they fall within a scope of the appended claims. That said, it has been found that perlite has been particularly effective in absorbing and limiting event energy while being non-electrically conducting, low flammability, having minimum environmental risk, lightweight, and conformable. In an embodiment, the outer layer 300 is also made from a non-electrically conducting, low flammability material, and includes a closable opening 302 that is sized to permit removal and replacement of the inner layer 200 with the volume-occupying material 206 contained therein. In an embodiment, the closable opening 302 is a zipper type seal.

To enhance the ability of the apparatus 100 to withstand a combustion event, the outer layer 300 is made of a durable heat resistant material, which may be nylon, polyester, Kevlar, or any other non-permeable material suitable for a purpose disclosed herein and falling within a scope of the appended claims.

To improve the utility of the apparatus 100 in an environment where the underground structure 1000 may be flooded with water, or the apparatus 100 is disposed in a deep well or service box (depicted by cylindrical cylinders in FIG. 1 for example), other features of the outer layer 300 may include at least one fluid drain port 304 (FIG. 2C), and/or at least one handle 306 (FIGS. 2A, 2B) securely attached to or integrated with the outer layer 300. In an embodiment, the at least one handle 306 includes two handles 306A, 306B disposed on opposing ends of the apparatus 100. In an embodiment, the at least one handle 306 includes or is made from a visibility enhancing material, such as a fluorescent material for example. In an embodiment, the at least one handle 306 may simply be a different yet more visible color than that of the outer layer 300.

As used herein, the phrase "equal to about" is intended to account for manufacturing tolerances and/or insubstantial deviations from a nominal value that do not detract from a purpose disclosed herein and falling within a scope of the appended claims.

Figure 4:
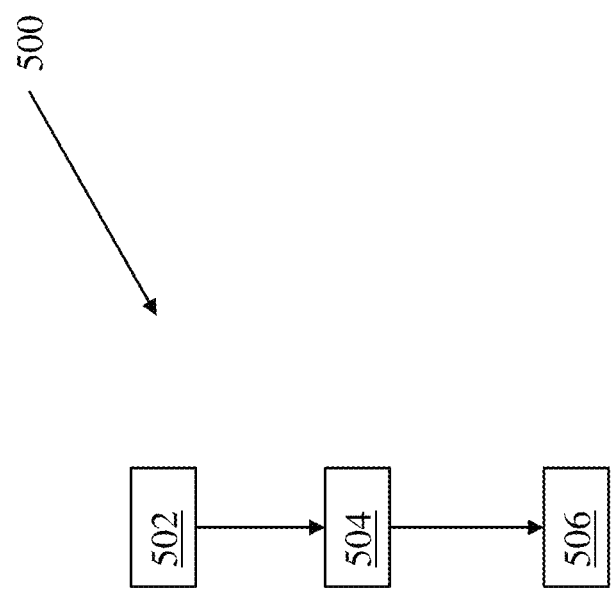
FIG. 4 depicts an example flowchart of a method of removing free space from an underground structure employing any apparatus of FIGS. 2A, 2B, 2C, 3A, 3B, in accordance with an embodiment.

From the foregoing description of structure of the apparatus 100 with any of the foregoing structural features and with reference now to FIG. 4, it will be appreciated that an embodiment disclosed herein also includes a method 500 of removing free space 1100 from an underground structure 1000, which includes: providing access 502 to the underground structure 1000, such as by removing a manhole cover 1200 for example; inserting 504 one or more of any form of the aforementioned apparatus 100 into the free space 1100 of the underground structure 1000 to occupy at least a portion of the free space 1100; and, closing access 506 to the underground structure 1000, such as replacing the manhole cover 1200 for example.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element as disclosed herein is referred to as being "on" another element, it can be directly on the other element, or intervening elements may also be present. In contrast, when an element is referred to as being "directly on" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

The invention claimed is:

1. An apparatus for limiting event energy in an underground structure having free space, the apparatus comprising:
    an inner layer configured to envelope and seal an interior volume, the inner layer comprising a non-permeable material;
    an outer layer configured to envelope the inner layer;
    wherein the interior volume comprises a volume-occupying material, comprising a solid material, a semi-solid material, a gaseous material, or any combination of the solid, the semi-solid, and the gaseous material; and
    wherein the non-permeable material of the inner layer is inflatable and deflatable that enables the apparatus to be inflated and conformable to underground utilities within the free space of the underground structure.

2. The apparatus of claim 1, further comprising:
    at least one handle securely attached to or integrated with the outer layer.

3. The apparatus of claim 2, wherein:
    the at least one handle comprises two handles disposed on opposing ends of the apparatus.

4. The apparatus of claim 2, wherein:
    the at least one handle comprises a visibility enhancing material.

5. The apparatus of claim 1, wherein:
    the interior volume is occupied by the volume-occupying material in an amount equal to or less than 90% and equal to or greater than 70% of a maximum available volume of the interior volume.

6. The apparatus of claim 1, wherein:
    the volume-occupying material comprises perlite.

7. The apparatus of claim 1, wherein:
    the inner layer comprises a material having one or more of the following characteristics: a non-electrically conductive material; and, a low flammability material.

8. The apparatus of claim 7, wherein:
    the material comprises polyethylene or polypropylene.

9. The apparatus of claim 1, wherein:
    the outer layer comprises a material having one or more of the following characteristics: a durable heat resistant material; a non-electrically conductive material; and, a low flammability material.

10. The apparatus of claim 9, wherein:
    the material comprises nylon, polyester, or Kevlar.

11. The apparatus of claim 1, wherein:
    the outer layer comprises at least one fluid drain port.

12. The apparatus of claim 1, wherein:
    the outer layer comprises a closable opening, the opening being sized to permit removal and replacement of the inner layer with the volume-occupying material contained therein.

13. The apparatus of claim 1, wherein:
    the inner layer comprises a self-sealing port configured to provide for inflation and deflation of the interior volume.

14. The apparatus of claim 13, wherein:
    the self-sealing port comprises a valve.

15. The apparatus of claim 14, wherein:
    the interior volume is inflated to an internal pressure of greater than 0 psi and equal to or less than 3 psi.

16. The apparatus of claim 14, wherein:
    the interior volume is inflated to an internal pressure of greater than 0 psi and equal to or less than 1 psi.

17. The apparatus of claim 14, wherein:
    the interior volume is inflated with air or an inert gas.

18. The apparatus of claim 1, wherein:
    the apparatus has an overall weight of equal to or greater than 5 pounds and equal to or less than 50 pounds.

19. The apparatus of claim 1, wherein:
    the apparatus has an overall weight of equal to or greater than 15 pounds equal to or less than 30 pounds.

20. The apparatus of claim 1, wherein:
    the apparatus has an overall occupancy volume of equal to or greater than 1 cubic feet and equal to or less than 5 cubic feet.

21. The apparatus of claim 1, wherein:
    the apparatus has an overall occupancy volume of equal to or greater than 1.5 cubic feet and equal to or less than 3.5 cubic feet.

22. The apparatus of claim 1, wherein:
    the outer layer has a 3D rectangular-box-like shape.

23. The apparatus of claim 1, wherein:
    the outer layer has a 3D cylindrical-disc-like shape.

24. The apparatus of claim 1, wherein:
    the outer layer has a 3D sphere-like shape.

25. A method of removing free space from an underground structure, comprising:
    providing access to the underground structure;
    inserting one or more of the apparatus of claim 1 into the free space of the underground structure to occupy at least a portion of the free space; and
    closing access to the underground structure.

* * * * *